Aug. 16, 1927.
H. C. SMITH
1,639,619
DRINK DISPENSER
Filed Aug. 21, 1924
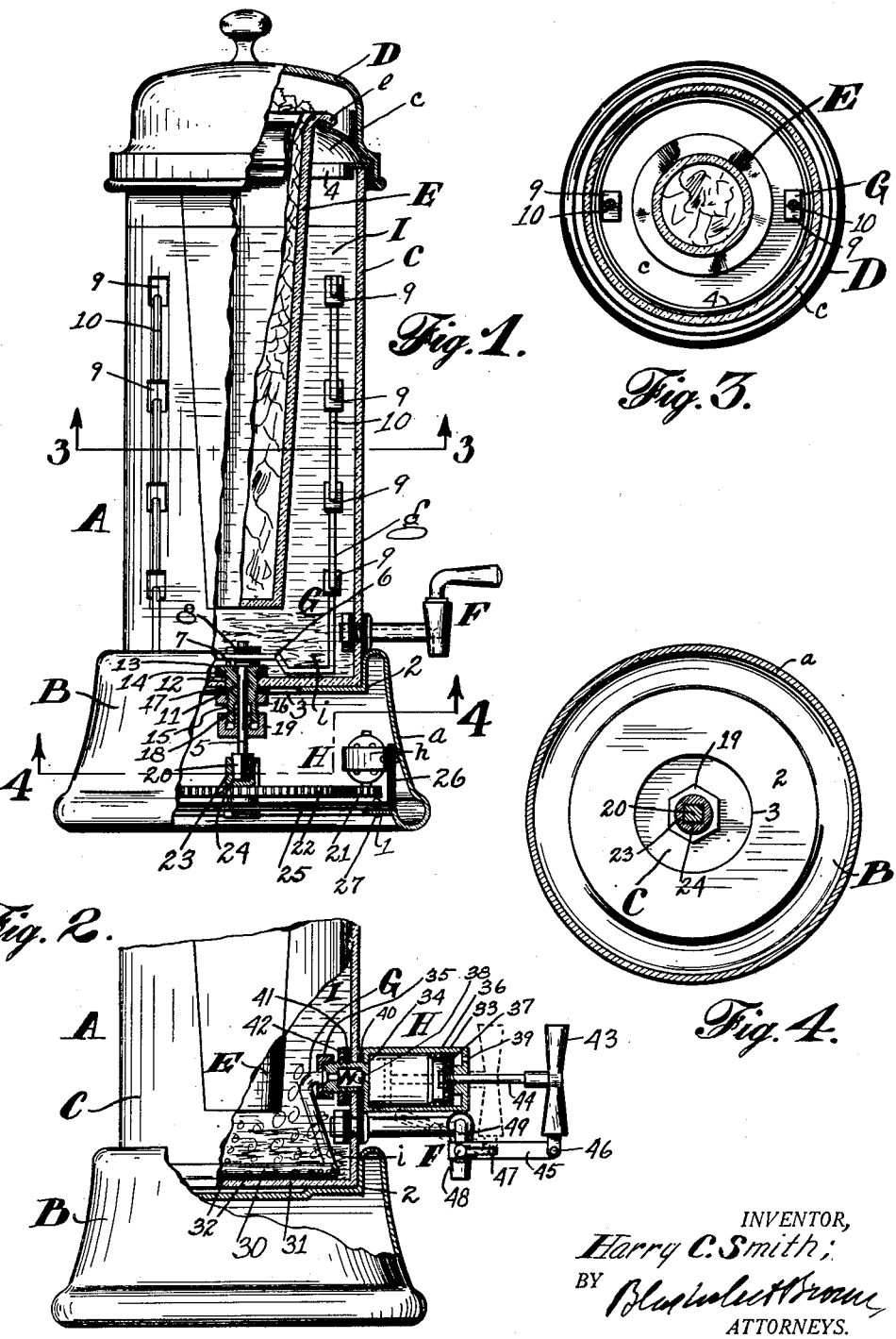
INVENTOR,
Harry C. Smith;
BY
ATTORNEYS.

Patented Aug. 16, 1927.

1,639,619

UNITED STATES PATENT OFFICE.

HARRY C. SMITH, OF LOS ANGELES, CALIFORNIA.

DRINK DISPENSER.

Application filed August 21, 1924. Serial No. 733,312.

This invention relates to drink dispensers for dispensing drinks such as fruit juices, and particularly orange juice.

The solid constituents of a fruit juice settle to the bottom of the dispenser in which it is contained and are soon drawn off through the faucet leading from the bottom of the dispenser, thus materially weakening the natural mixture of the remaining portion of the juice, so that in dispensing the juice to the trade the first customers are served with a fruit juice holding in solution a considerable proportion of its essence or solid constituents, while the remaining customers are served with a juice holding in solution only a small proportion of its essence or solid constituents, or in other words the first customers are served with a strong drink while the remaining customers are served with a weak drink.

Means have been heretofore provided for agitating the juice in dispensers to distribute the solid constituents of the juice evenly throughout the same but the operation of such means depended upon the will of the operator, who usually failed to operate the same immediately before dispensing the juice, thus rendering such means ineffective for the purpose intended.

One main object of my invention is to provide a fruit juice dispenser which will completely agitate the juice therein, independently of the will of the operator, at all times before the juice is dispensed therefrom.

Another object is to provide improved mechanical agitating means and improved pneumatic agitating means of the character stated in the preceding paragraph, or their equivalents.

In carrying out the invention I may provide agitator operating means for the dispenser, connected to the dispenser faucet, which means must be actuated in order to open the faucet, whereby the juice in the dispenser is agitated each time before any juice is dispensed.

Other objects and advantages will appear hereinafter, and include general superiority in structure and efficiency.

With the above and other objects in view the invention consists in the novel and useful provision, combination and association of parts, members and features, all as hereinafter described, shown in the drawing and finally pointed out in claims.

In the drawing:

Figure 1 is a view partly in elevation and partly in vertical section of one form of my fruit juice dispenser;

Figure 2 is a fragmentary view partly in elevation and partly in vertical section of another form of my dispenser;

Figure 3 is a horizontal section of my dispenser taken on the line 3—3 of Fig. 1; and, Figure 4 is a horizontal section taken on line 4—4 of Fig. 1.

Corresponding reference characters designate corresponding parts in all the figures.

Referring with particularity to the drawing A designates my fruit juice dispenser in its entirety, which comprises in general a base B, container C, closure D, ice receptacle E, faucet F, agitator G, and agitator operating means H.

In one preferred form, shown in Figures 1, 3 and 4, the base B comprises an annular shell $a$ formed with an internal horizontal flange 1 slightly above its lower edge and with a socket 2 in the top thereof, there being a central opening 3 in the bottom of said socket.

The container C is preferably constructed of glass and rests within the socket 2. The faucet F is connected to the lower portion of the container and extends over the upper edge of the base B. An inwardly arched ring $c$ rests upon the upper edge of the container C and is formed with a depending annular flange 4 which extends into the upper end of the container and centers the ring on top of the container.

The ice receptacle E hangs downwardly through the ring $c$ into the container C and is formed with an external flange $e$ at its upper edge which engages the ring $c$ and supports the receptacle in position in the container.

The cap D rests over the top of the ice receptacle E upon the outer portion of the ring $c$.

The agitator G, shown in Fig. 1 comprises a U-shaped agitator element $g$ and a shaft 5, the upper end of which shaft extends through the connecting member 6 of the agitator element and is secured to said member by nuts 7 and 8 which screw on said end of the shaft against the lower and upper sides respectively of said connecting member. Paddles 9 are secured in spaced relation one above the other on the vertical arms 10 of the agitator element $g$, which paddles are inclined downwardly in a clockwise direction. A bearing 11 extends through an opening 12 in the bottom of the container and through the socket opening 3, which bearing is formed with an external flange 13 at its upper end which rests upon a gasket 14 surrounding the bearing and resting upon the inside of the bottom of the container. The lower portion of the bearing 11 is threaded as at 15 and a nut 16 screws on said thread against a gasket 17 surrounding the bearing under the bottom of the container C, whereby the bearing is clamped to the bottom of the container and the gaskets 14 and 17 clamped around the opening 12 in said bottom, thus sealing said opening and preventing leakage therethrough from the container. The lower portion of the bearing is formed with a packing box 18 and the lower end of said packing box is closed by a gland 19 which screws on the thread 15. The agitator shaft 5 extends through the bearing 11, packing box 18 and gland 19 and is journaled in said bearing. A square tapered coupling member 20 is formed on the lower end of the shaft 5.

The agitator operating means H compresses a motor $h$, a pinion 21 secured on the motor shaft, a gear 22, in mesh with said pinion, and a coupling 23 for coupling the shaft 5 to the gear, said coupling including the coupling member 20 and a square socket 24 in the upper end of the hub of the gear 22, which socket receives said coupling member. The gear 22 is journaled on a frame 25 and the motor $h$ is secured on an arm 26 upstanding from one side of the frame. Said frame rests upon the base flange 1 and is riveted to said flange by rivets 27.

The agitator element $g$ is continuously rotated by the motor $h$ in a clockwise direction or in the direction of downward inclination of the paddles 9, and the solid constituents $i$, which have settled to the bottom of the container, are lifted and diffused evenly throughout the whole body of the juice and thoroughly mixed therein.

The container C may be readily lifted out of the socket 2 or placed therein, the coupling element 20 passing freely out of and into the coupling socket 24.

In the form of my invention shown in Fig. 2 the agitator G comprises an air tube 30 which rests upon the bottom 31 of the container, which tube is provided with air outlet perforations 32. The bottom 31 of the container in this form of my invention has no opening 12. The agitator operating means H comprises an air compressor 33 formed with a threaded nipple 34 which extends through an aperture in the wall of the container C immediately above the faucet F and is coupled to one end of the air pipe 30 by means of a union 35. The compressor 33 comprises a cylinder 36, from which the nipple 34 extends, and a piston 37 which reciprocates in said cylinder. A check valve 38 is provided in the nipple to prevent escape of air from the nipple back into the cylinder. The cylinder 36 has an air inlet port 39. A gasket 40 surrounds the nipple 34 between the container C and the adjacent end of the cylinder 36 and a gasket 41 surrounds the nipple 34 within the container. A nut 42 screws on the nipple thread against the gasket 41, drawing said gasket against the inside of the container and clamping the gasket 40 between the outside of the container and the end of the compressor cylinder, thus clamping the compressor in position on the container C. A handle 43 is secured on the outer end of the piston rod 44 and a link 45 is pivotally connected at one end to the handle at 46, the other end of said link being provided with a slot 47 through which extends the end 48 of the faucet operating handle 49.

Normally the piston 37 is drawn to the outer end of its stroke in which position the faucet F is held closed by the engagement of the outer end of the slot 47 with the end 48 of faucet handle 49, as shown in full lines in Fig. 2. In order to open the faucet the piston 37 must be pushed inwardly, which is done upon grasping the handle, whereupon air is forced from the cylinder 36 past valve 38, through nipple 34 and pipe 30, and out of the pipe through perforations 32 into the bottom of the container, which air passes upwardly through the juice I and raises the solid constituents $i$ in the bottom of tht container, diffusing the same throughout the body of the juice and thoroughly mixing such constituents with the liquid of the juice, but before the piston reaches the end of its inward stroke the inner end of slot 47 engages the end 48 of handle 49 and opens the faucet, thus thoroughly agitating and mixing the juice each time before the juice is drawn from the container through the faucet and dispensed.

Air may be forced by the compressor 33 through tube 30 and its perforations 32 into the juice to agitate the same, without opening the faucet F, upon pushing the piston 37 inwardly only part way, so that the inner end of the slot 47 does not engage the handle end 48 and turn the faucet handle 49.

Having thus disclosed my invention, I claim and desire to secure by Letters Patent:

1. In a fluid dispenser, a container for the fluid, an agitator comprising a perforated air tube mounted in the bottom of said container, an air compressor mounted on said container to which said tube is connected, a handle for operating said compressor, a link connected at one end to said handle and provided with a slot in its other end through which the handle of the faucet extends whereby the faucet is opened as the inner end of said slot engages said handle and the compressor completes its stroke.

2. In a fluid dispenser, a drink container, a faucet leading from said container, an agitator mounted in said container, operating means for said agitator, and means connecting said operating means and the handle of said faucet to enable said operating means to operate said agitator independently of said faucet to operate said agitator each time before opening said faucet.

3. In a fluid dispenser, a container for the fluid, a faucet leading from said container, an agitator comprising a perforated air tube in the bottom of said container below said faucet and air compressor mounted on said container to which said tube is connected, a handle for operating said compressor, a link connected at one end to said handle and provided with a slot in its other end through which the handle of the faucet extends whereby the faucet is opened as the inner end of said slot engages said handle and the compressor completes its stroke.

4. In a fluid dispenser, a drink container, a faucet leading from said container, an air compressor mounted on said container above said faucet, an agitator comprising a perforated air tube positioned in said container below said faucet and connected with said air compressor, operating means for said agitator, and means connecting said operating means and the handle of said faucet to enable said operating means to operate said agitator independently of said faucet or to operate said agitator each time before opening said faucet.

In testimony whereof, I have signed my name to this specification.

HARRY C. SMITH.